(12) United States Patent
Lin et al.

(10) Patent No.: US 6,442,636 B1
(45) Date of Patent: Aug. 27, 2002

(54) PARALLEL BUS SYSTEM CAPABLE OF EXPANDING PERIPHERAL DEVICES

(75) Inventors: Angus Lin; Hung-Ta Kuo, both of Hsin-Chu (TW)

(73) Assignee: Princeton Technology Corporation, Taipei Hsien (TW)

( * ) Notice: Subject to any disclaimer, the term of this patent is extended or adjusted under 35 U.S.C. 154(b) by 0 days.

(21) Appl. No.: 09/350,109

(22) Filed: Jul. 9, 1999

(51) Int. Cl.$^7$ ................................................ G06F 13/00
(52) U.S. Cl. ....................................................... 710/300
(58) Field of Search ................................. 710/100, 300, 710/305, 306, 110, 107

(56) References Cited

U.S. PATENT DOCUMENTS 5,619,659 A * 4/1997 Kikinis et al. ............... 710/101
5,694,557 A * 12/1997 Yang ............................ 710/129
5,964,856 A * 10/1999 Wu et al. ..................... 710/110
6,282,598 B1 * 8/2001 Manabe ....................... 710/107

* cited by examiner

Primary Examiner—Peter Wong
Assistant Examiner—X. Chung-Trans
(74) Attorney, Agent, or Firm—Bacon & Thomas

(57) ABSTRACT

A parallel bus system for enabling the addition of peripheral devices includes a central processing unit, at least one peripheral device, and a parallel bus for connecting the central processing unit and the at least one peripheral device. One line of the parallel bus is used as the peripheral device selecting line, and another line of the parallel bus is used as the system clock line. Other lines of the parallel bus are lines to form one byte of the system. The messages flowing on the other lines include instruction bytes, address bytes, and data bytes. In general, instruction bytes are first to be put on the other lines, followed by address bytes, and then data bytes.

16 Claims, 3 Drawing Sheets

PARALLEL BUS SYSTEM CAPABLE OF EXPANDING PERIPHERAL DEVICES

FIELD OF THE INVENTION

The present invention relates to a parallel bus system, and more particularly to a parallel bus system capable of accommodating the addition of peripheral devices to a "System on Chip" or other similar system.

BACKGROUND OF THE INVENTION

A "System on Chip" is generally as shown in FIG. 1, in which a chip 1 includes a central processing unit 11, a decoder 12, and several peripheral devices 13, 14, and 15. Since the interconnections CS1, CS2, CS3 and the bus 10 are fixed, it is very difficult to add other peripheral devices is needed. If two such Chips are connected for expanding, not only are the interconnections very complicated, but also the software programming is very tedious.

Up to the present, some serial bus systems are capable of expanding peripheral devices, but the related instructions and data transmission are very slow due to the series-connection thereof.

OBJECTS OF THE INVENTION

It is therefore an object of the present invention to provide a parallel bus system capable of expanding peripheral devices, such that related peripheral devices can be designed to adapt to it very easily for expanding the system.

It is another object of the present invention to provide a parallel bus system such that the peripheral devices can also control the bus for data transmission when needed.

It is a further object of the present invention to provide a parallel bus system that can include two or more central processing units to control the bus by time-sharing.

BRIEF DESCRIPTION OF THE DRAWINGS

The present invention can be better understood with the following drawings, in which.

DETAILED DESCRIPTION OF THE INVENTION

Figure 1:
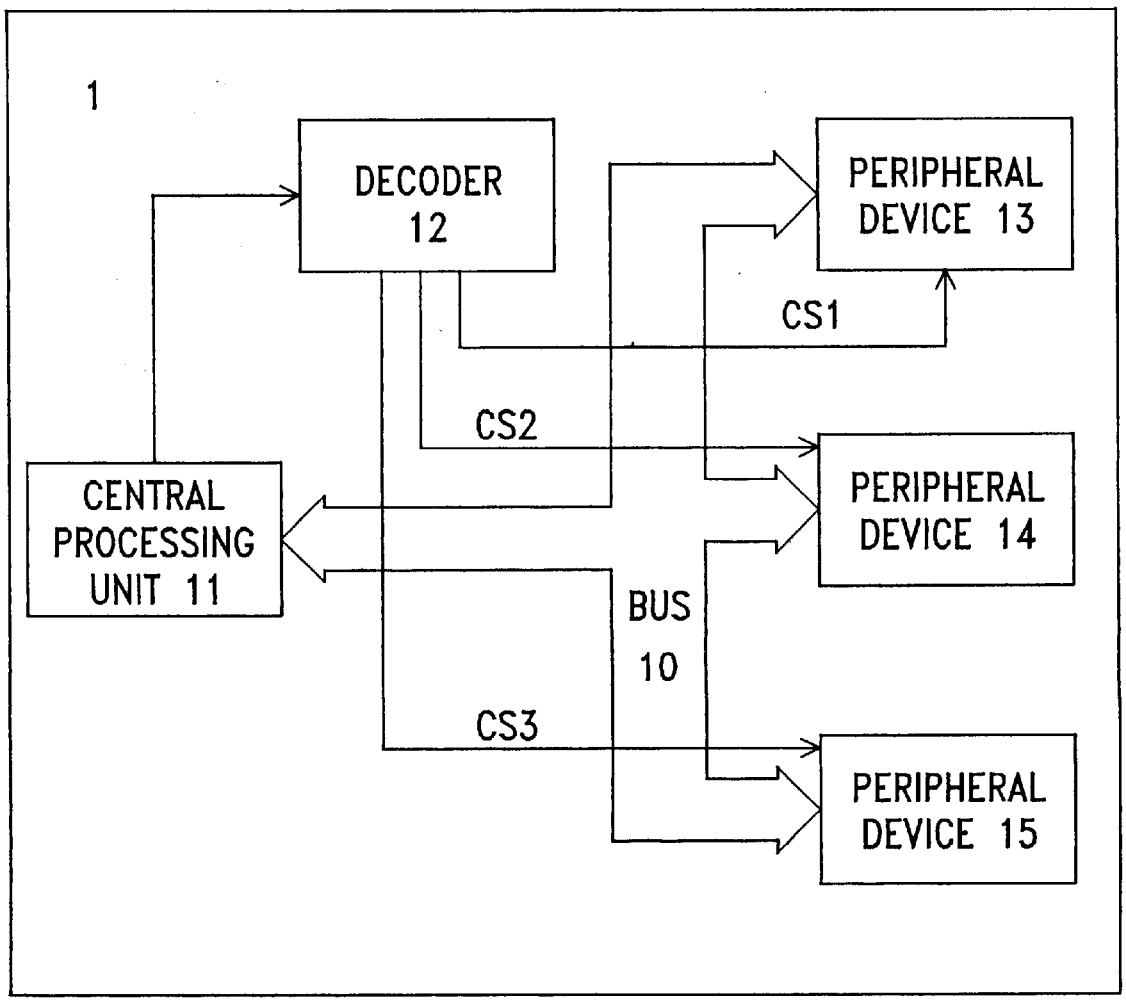
FIG. 1 is a schematic diagram showing a conventional System on Chip.
Figure 2:
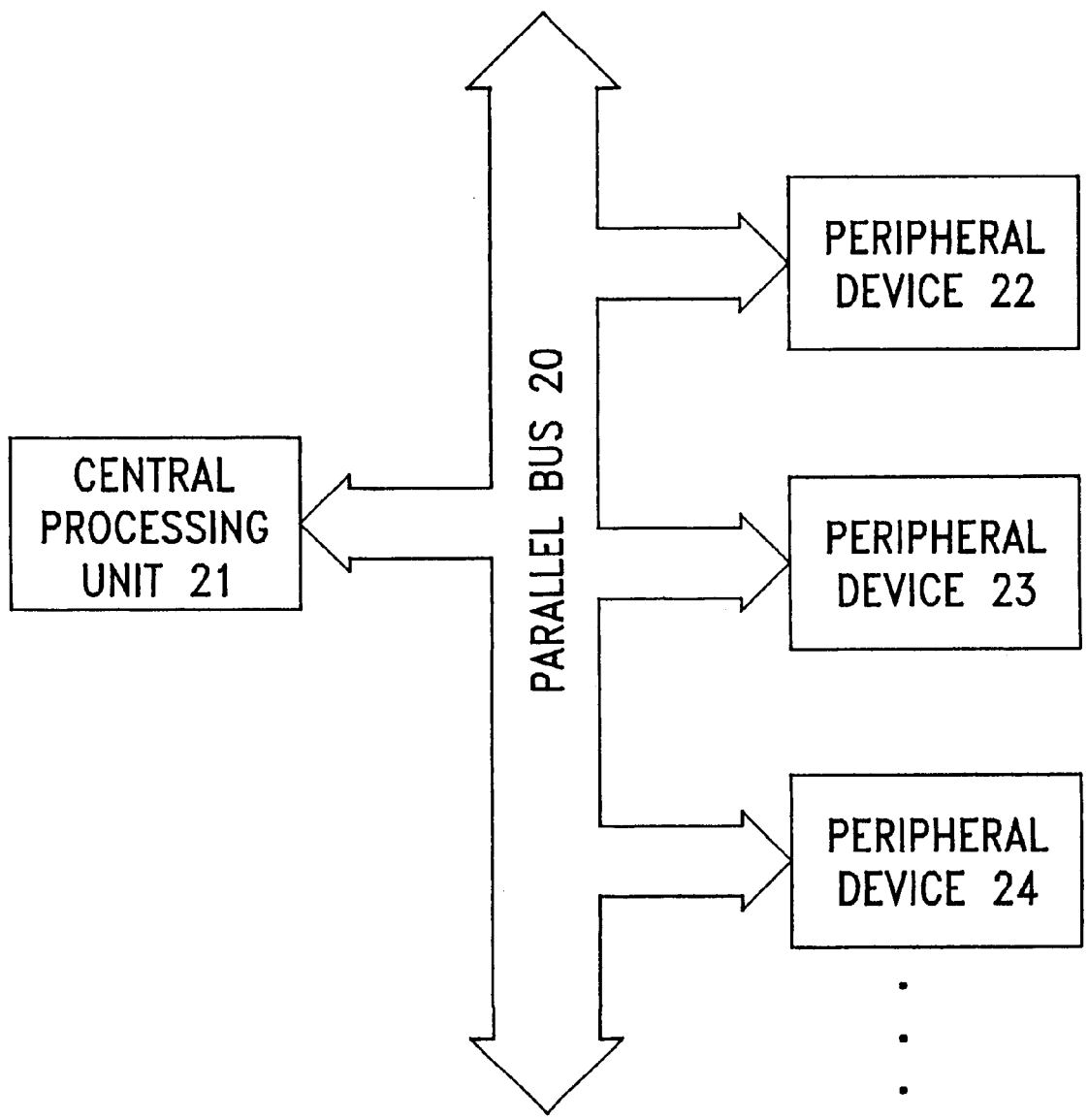
FIGS. 2 is a schematic diagram showing a parallel bus system of the present invention.

Referring to FIG. 2, which is a schematic diagram showing a parallel bus system of the present invention. A central processing unit 21 and several peripheral devices 22, 23, 24 are connected by a parallel bus 20. The parallel bus 20 has 10 lines (the number of lines are not limited according to the present invention) with functions as shown in Table 1 below:

TABLE 1

| Line no. | Name | Description |
|---|---|---|
| 1~8 | CD0~CD7 | Lines for transmitting instruction byte, address byte, and data byte. |
| 9 | SCLK | System clock line |
| 10 | CSB | Peripheral device selectmg line |

The system clock line SCLK is a line to transmit the system clock signal of the central processing unit 21 to peripheral devices 22, 23, 24.

The peripheral device selecting line CSB is a line to be used by the central processing unit 21 to inform all the peripheral devices to accept messages or not. For example, a CSB line with low voltage represents that all the peripheral devices are informed to accept messages, otherwise all the peripheral devices are idle.

After the central processing unit 21 informs all the peripheral devices to prepare to accept messages, the instruction bytes will first be outputted to CD0~CD7 lines, followed by the address bytes, and then the data bytes. Each peripheral device will then interpret those messages in order to work accordingly.

An instruction byte (8 bits) will first be outputted to lines CD0~CD7. Line CD0 is specified to be 1 (i.e. high voltage) so that all the peripheral devices can acknowledge that the byte is an instruction byte. Table 2 shows several instruction bytes of the system:

TABLE 2

| Instruction name | CD0~CD7 | Description |
|---|---|---|
| IDEN | 1100ID0~ID3 | Selecting peripheral device |
| COMBO | 1101DA0~DA3 | Selecting subdevice in peripheral device |
| MODE1 | 11100001 | The size of memory in peripheral device is small. |
| MODE2 | 11100010 | The size of memory in peripheral device is large. |
| NAUTO | 11101000 | Next memory address will not increase/decrease automatically. |
| AUTOA1 | 11101100 | Next memory address will increase by 1 automatically. |
| AUTOA2 | 11101101 | Next memory address will increase by 2 automatically. |
| AUTOS1 | 11101110 | Next memory address will decrease by 1 automatically. |
| AUTOS2 | 11101111 | Next memory address will decrease by 2 automatically. |
| WR1B | 11110000 | Write in 1 byte data |
| WR2B | 11110001 | Write in 2 byte data |
| WR3B | 11110010 | Write in 3 byte data |
| WR4B | 11110011 | Write in 4 byte data |
| RMW1B | 11110100 | Read 1 byte, modify it then write back. |
| RMW2B | 11110101 | Read 2 bytes, modify it then write back. |
| RMW3B | 11110110 | Read 3 bytes, modify it then write back. |
| RMW4B | 11110111 | Read 4 bytes, modify it then write back. |
| RFW1B | 11111000 | Write in 1 byte, then read to check. |
| RFW2B | 11111001 | Write in 2 bytes, then read to check. |
| RFW3B | 11111010 | Write in 3 bytes, then read to check. |
| RFW4B | 11111011 | Wnte in 4 bytes, then read to check. |
| RDIB | 11111100 | Read 1 byte data |
| RD2B | 11111101 | Read 2 byte data |
| RD3B | 11111110 | Read 3 byte data |
| RD4B | 11111111 | Read 4 byte data |
| REGISTER | $10R_5R_4R_3R_2R_1R_0$ | Selecting register |

Several instruction bytes (a byte has 8 bits in the present system) are generally outputted to the bus one after another. The first byte is an IDEN for specifying which peripheral device will accept messages. The first four bits of IDEN are "1100", while the latter four bits of IDEN represent the code of the related peripheral device. The present system can specify 16 devices. After IDEN instruction, a COMBO or MODE1/Mode2 or NAUTO/AUTOA1/AUTOA2/AUTOS1/AUTOS2 will be sent to the bus.

A COMBO instruction means that the specified peripheral device includes several subdevices, the latter four bits of the COMBO instruction being used to designate the related subdevice. The present system can include 16 subdevices. MODE1/MODE2 are used to specify that the memory size of the related peripheral device is small or large. NAUTO is used to specify that the next memory address will not increase/decrease automatically, while AUTOA1/AUTOA2/AUTOS1/AUTOS2 are used to specify that the next memory address will increase/decrease automatically by 1 or 2 for transmitting data bytes continuously without adding an instruction byte or address byte for each data byte.

Next, one of the 16 read/write instructions will be put on the bus. Read/write instructions can be classified as below:

1. Write In Instructions

There are four such instructions, i.e. WR1B, WR2B, WR3B, WR4B, for writing 1 byte, 2 bytes, 3 bytes, or 4 bytes data into the peripheral device from the central processing unit.

2. Instructions to Read Out Data, Modify it Then Write Back

There are four such instructions, i.e. RMW1B, RMW2B, RMW3B, RMW4B, for reading out 1 byte, 2 bytes, 3 bytes, or 4 bytes data from the peripheral device to the central processing unit, modifying it, then writing back.

3. Instructions to Write in Data, Then Read Out to Check

There are four such instructions, i.e. RFW1B, RFW2B, RFW3B, RFW4B, for writing 1 byte, 2 bytes, 3 bytes, or 4 bytes data from the central processing unit into the peripheral device, then reading back to check.

4. Read Instructions

There are four such instructions, i.e. RD1B, RD2B, RD3B, RD4B, for reading out 1 byte, 2 bytes, 3 bytes, or 4 bytes data from the peripheral device to the central processing unit.

As to the REGISTER instruction, which is used to instruct the central processing unit to output data to the related register in a related peripheral device for processing, the first 2 bits are "10", and the next 6 bits $R_5R_4R_3R_2R_1R_0$ can designate 64 registers.

After the instruction bytew, the address bytes are then outputted. The address bytes are shown in Table 3 as below:

TABLE 3

| Address instruction | CD0~CD7, CD0~CD7, CD0~CD7 | Description |
|---|---|---|
| (Address) | 00A21~A16, A15~A8, A7~A0 | MODE2:4MB |
| (Address) | 010A20~A16, A15~A8, A7~A0 | MODE2:2MB |
| (Address) | 0110A19~A16, A15~A8, A7~A0 | MODE2:1MB |
| (Address) | 01110A18~A16, A15~A8, A7~A0 | MODE2:512KB |
| (Address) | 011110A17~A16, A15~A8, A7~A0 | MODE2:256KB |
| (Address) | 0111110A16, A15~A8, A7~A0 | MODE2:128KB |
| (Address) | 01111110, A15~A8, A7~A0 | MODE2:64KB |
| (Address) | 01111111, 0 A14~A8, A7~A0 | MODE2:32KB |
| (Address) | 01111111, 10 A13~A8, A7~A0 | MODE2:16KB |
| (Address) | 01111111, 110 A12~A8, A7~A0 | MODE2:8KB |
| (Address) | 01111111, 1110 A11~A8, A7~A0 | MODE2:4KB |

The address instructions in Table 3 are described in MODE 2. Three bytes are sequentially outputted to CD0~CD7 lines according to the memory size. For example, if the memory size is 4 MB, then the first two bits of the first byte are "00"; if the memory size is 2 MB, then the first three bits of the first byte are "010"; and so on. Please note that the first bit CD0 of the first address byte is specified as "0", so as to distinguish from the first bit of the instruction byte.

If MODE1 instruction has been used in the instruction bytes, then the address byte has only one byte to represent that the memory size is only 128 bytes.

The data byte will be sent after the address bytes, and the number of the data bytes are specified by the aforementioned 16 read/write instructions.

After the data bytes are sent, the peripheral device selecting line CSB will be changed into high voltage to inform all the peripheral devices that the messages of the present cycle are ended.

The peripheral devices can also be designed to cooperate with the central processing unit to control the parallel bus of the present invention. For example, the peripheral device can be designed to control the peripheral device selecting line CSB after the central processing unit stops to control the peripheral device selecting line CSB, and begin to inform other peripheral devices to accept messages.

Figure 3:
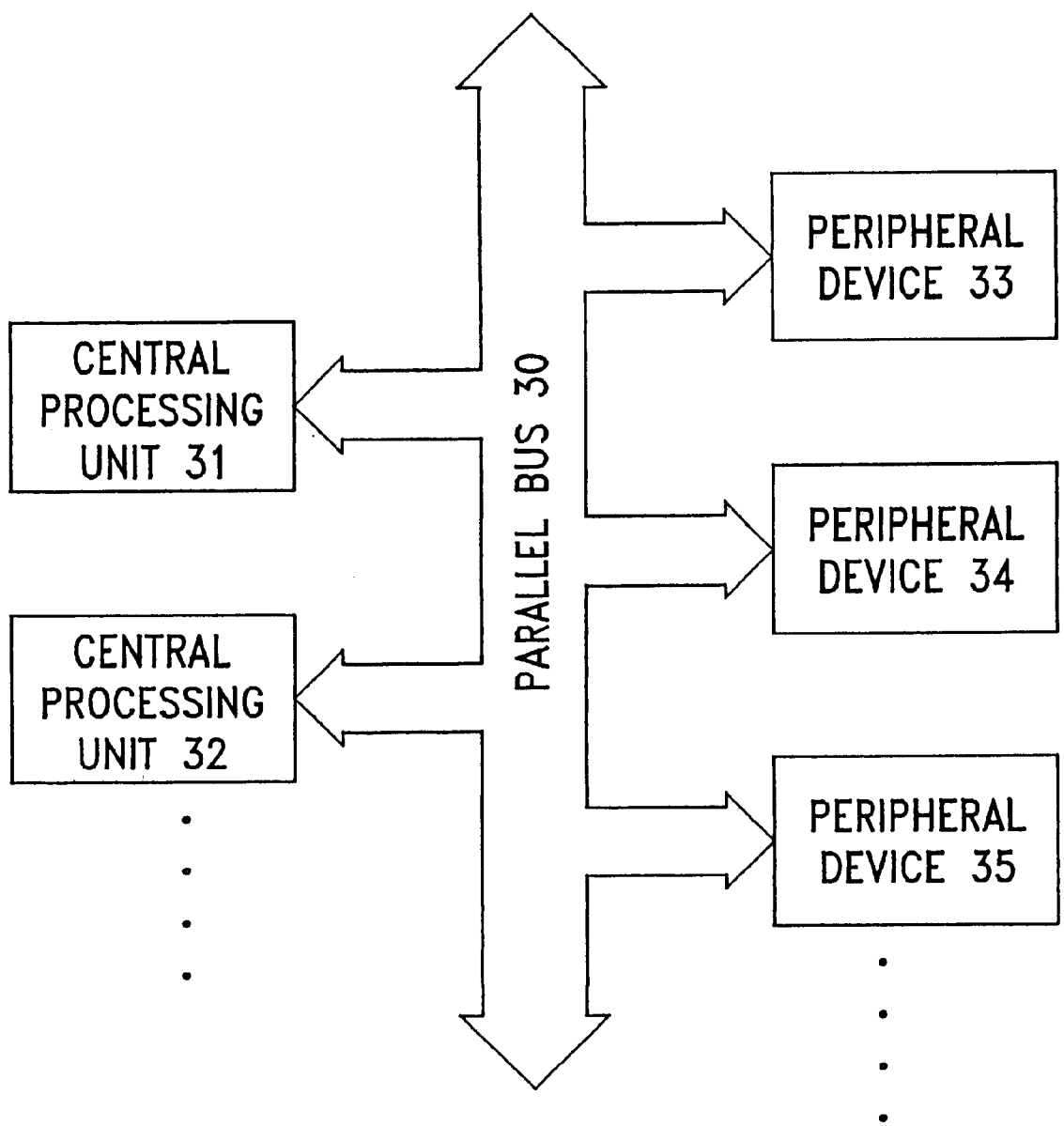
FIG. 3 is a schematic diagram showing that another parallel bus system of the present invention has two central processing units.

Referring to FIG. 3, which is another system of the present invention. Two central processing units 31, 32 are arranged to control related peripheral devices respectively, provided that the parallel bus 30 is idle. And one of the central processing units can be designed to have the priority to interrupt the other central processing unit for controlling the bus.

The number of lines, the size of the byte, positive or negative logic, the order of lines, the kinds of instruction bytes and address bytes, the number of central processing units are not limited according to the present invention. The present invention is also not limited to a System on Bus. The above embodiments are only used for description, and can not be treated as a limitation. The spirit and scope of the present invention will only be limited by the appended claims.

What is claimed is:

1. A parallel bus system capable of expansion, having a central processing unit, at least one peripheral device, and a parallel bus for connecting said central processing unit and said at least one peripheral device, said parallel bus comprising:
   1. a peripheral device selecting line;
   2. a system clock line;
   3. several other lines arranged to form lines for transmitting simultaneously a byte of said system, wherein said byte is an instruction byte, an address byte, or a data byte, wherein said instruction byte is put on said bus first, followed by said address byte, and then said data byte, and wherein a first bit of said byte specifies whether said byte is an instruction byte,
   wherein said peripheral device selecting line is a line used by said central processing unit for informing all of said peripheral devices whether to accept said bytes, and
   wherein at least one said instruction byte is used to designate said peripheral device to accept a following address byte and data byte.

2. The system according to claim 1, wherein said peripheral device selecting line is a line used by said central processing unit for informing all of said peripheral devices to accept said bytes or not.

3. The system according to claim 1, wherein at least one instruction byte for selecting peripheral device is included, which is used for designating related peripheral device to accept the address byte and the data byte followed.

4. The system according to claim 1, wherein at least one additional instruction byte for selecting a register in said peripheral device is included.

5. The system according to claim 1, wherein at least one instruction byte for specifying the number of consecutive address bytes after an instruction is included.

6. The system according to claim 1, wherein at least one instruction byte to determine is an address for storing data in said peripheral device is increasing or decreasing automatically.

7. The system according to claim 6, wherein if said instruction byte to determine if an address for storing data in peripheral device is increasing or decreasing automatically is used, any related data which follows can omit said instruction byte and said address byte.

8. The system according to claim 1, wherein the following four kinds of instruction byte are included:

a) a read instruction;

b) a write instruction;

c) an instruction to read out data, modify said data, then write back;

d) an instruction to write in data, then read the data to check the data.

9. The system according to claim 8, wherein said four kinds of instruction byte specify the number of data bytes following an address byte.

10. The system according to claim 8, wherein said read instruction is used to read out data from a peripheral device.

11. The system according to claim 8, wherein said write in instruction is used to write related data into a peripheral device.

12. The system according to claim 8, wherein said instruction to read out data, modify said data then write back is used to read out related data in a peripheral device, and process said data, then write said data back to an original address of said data.

13. The system according to claim 8, wherein said instruction to write in data, then read out to check is used to write in a data into a peripheral device, and then read out to check if said data is properly written in.

14. The system according to claim 1, wherein said peripheral device selecting line will inform all of said peripheral devices to stop accepting bytes when said address byte and said data byte are sent according to said instruction byte.

15. The system according to claim 8, wherein when said peripheral device selecting line is not used by said central processing unit, a peripheral device having a processor therein can utilize said peripheral device selecting line to control another peripheral device for accepting related data.

16. The system according to claim 1, wherein the number of said central processing unit is more than 1, and each central processing unit is connected with said parallel bus for controlling said peripheral device by time-sharing, or one of said central processing unit is designed to have a priority to interrupt another central processing unit and control said parallel bus.

* * * * *